(12) United States Patent
Searfoss

(10) Patent No.: US 10,703,180 B2
(45) Date of Patent: *Jul. 7, 2020

(54) COVER SYSTEM FOR OPEN-TOPPED CONTAINERS

(71) Applicant: Aero Industries, Inc., Indianapolis, IN (US)

(72) Inventor: Timothy K. Searfoss, West Branch, MI (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/022,840

(22) Filed: Jun. 29, 2018

(65) Prior Publication Data

US 2018/0319258 A1 Nov. 8, 2018

Related U.S. Application Data

(63) Continuation-in-part of application No. 15/252,831, filed on Aug. 31, 2016, now Pat. No. 10,023,033.

(60) Provisional application No. 62/386,294, filed on Nov. 25, 2015, provisional application No. 62/387,563, filed on Dec. 24, 2015, provisional application No. 62/213,052, filed on Sep. 1, 2015.

(51) Int. Cl.
*B60J 7/08* (2006.01)

(52) U.S. Cl.
CPC ................. *B60J 7/085* (2013.01)

(58) Field of Classification Search
CPC ........................................ B60J 7/085
USPC .......................................... 296/98
See application file for complete search history.

(56) References Cited

U.S. PATENT DOCUMENTS

| | | |
|---|---|---|
| 6,338,521 B1 | 1/2002 | Henning |
| 6,474,719 B2 | 11/2002 | Henning |
| 2002/0033615 A1 | 3/2002 | Henning |
| 2003/0193208 A1 | 10/2003 | Ciferri et al. |
| 2008/0116709 A1 | 5/2008 | Royer |

FOREIGN PATENT DOCUMENTS

GB 2 401 087 A 11/2004

OTHER PUBLICATIONS

Australian Examination Report corresponding to Australian application No. 2016317051 dated Mar. 22, 2019 (5 pages).

*Primary Examiner* — Joseph D. Pape
(74) *Attorney, Agent, or Firm* — Maginot, Moore & Beck, LLP

(57) ABSTRACT

An arm assembly for a cover system includes a force mechanism contained within a hollow arm of the assembly that includes a resiliently compressible element, such as a compression spring, with a cable or wire extending through the element. The cable is fastened at one end to an end cap that bears against one end of the compression spring. The opposite end of the cable is fastened to a base mounted to the container body. The base includes a pulley about which the cable is wound as the arm pivots relative to the base. As the arm pivots and the cable winds about the pulley, the end cap bears against the spring to compress the spring.

19 Claims, 23 Drawing Sheets

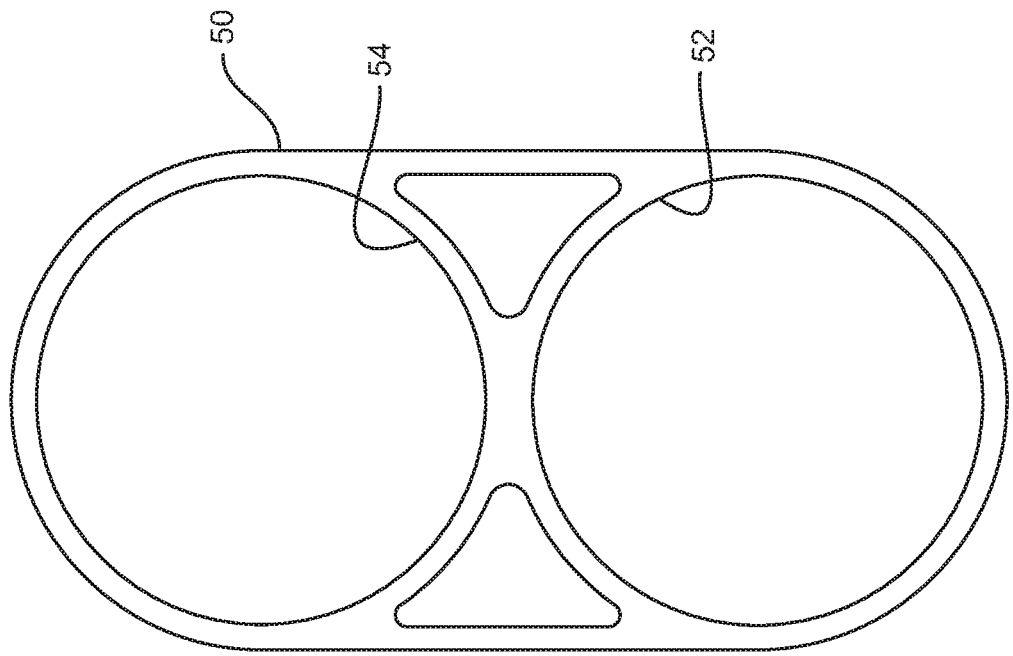

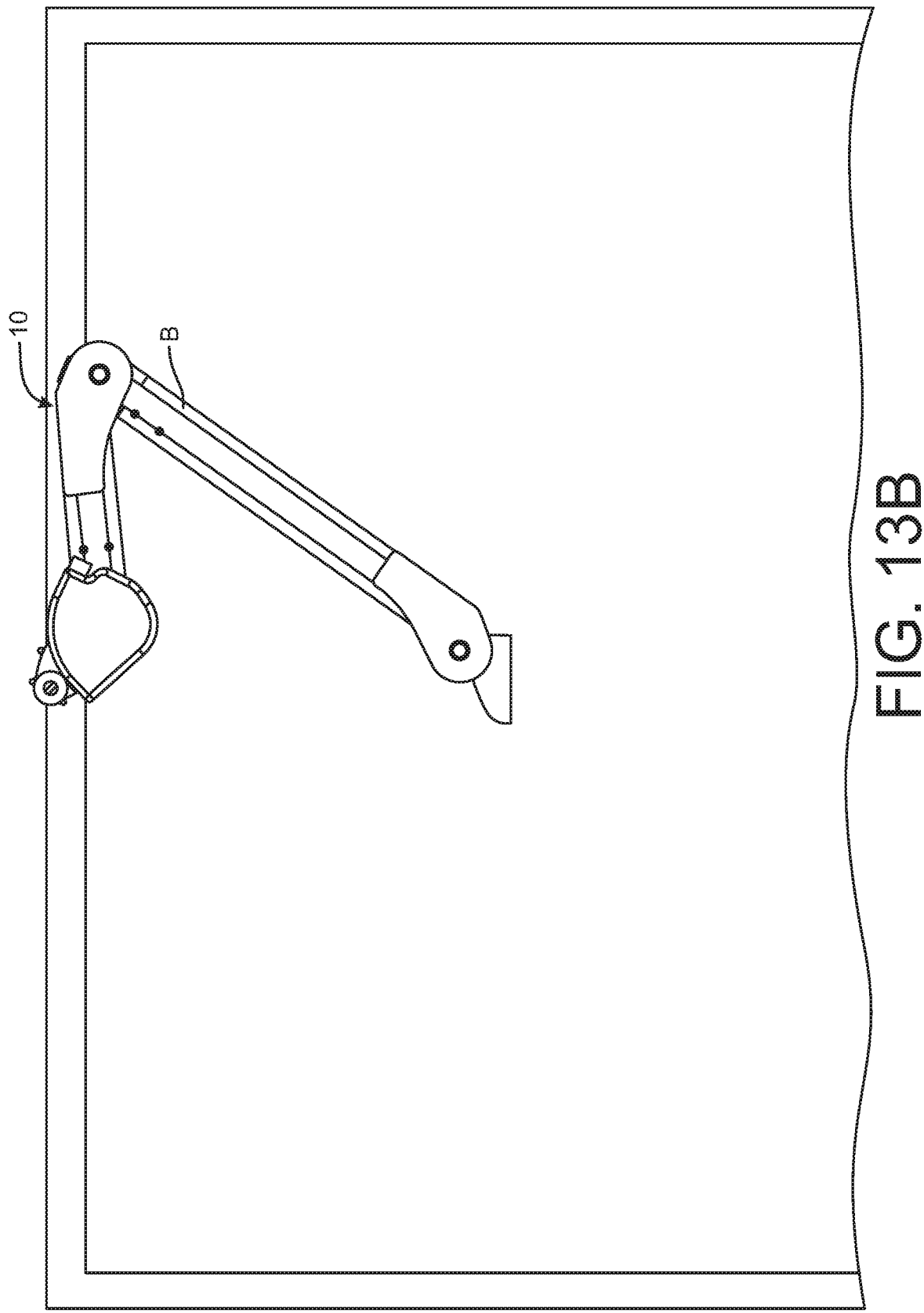

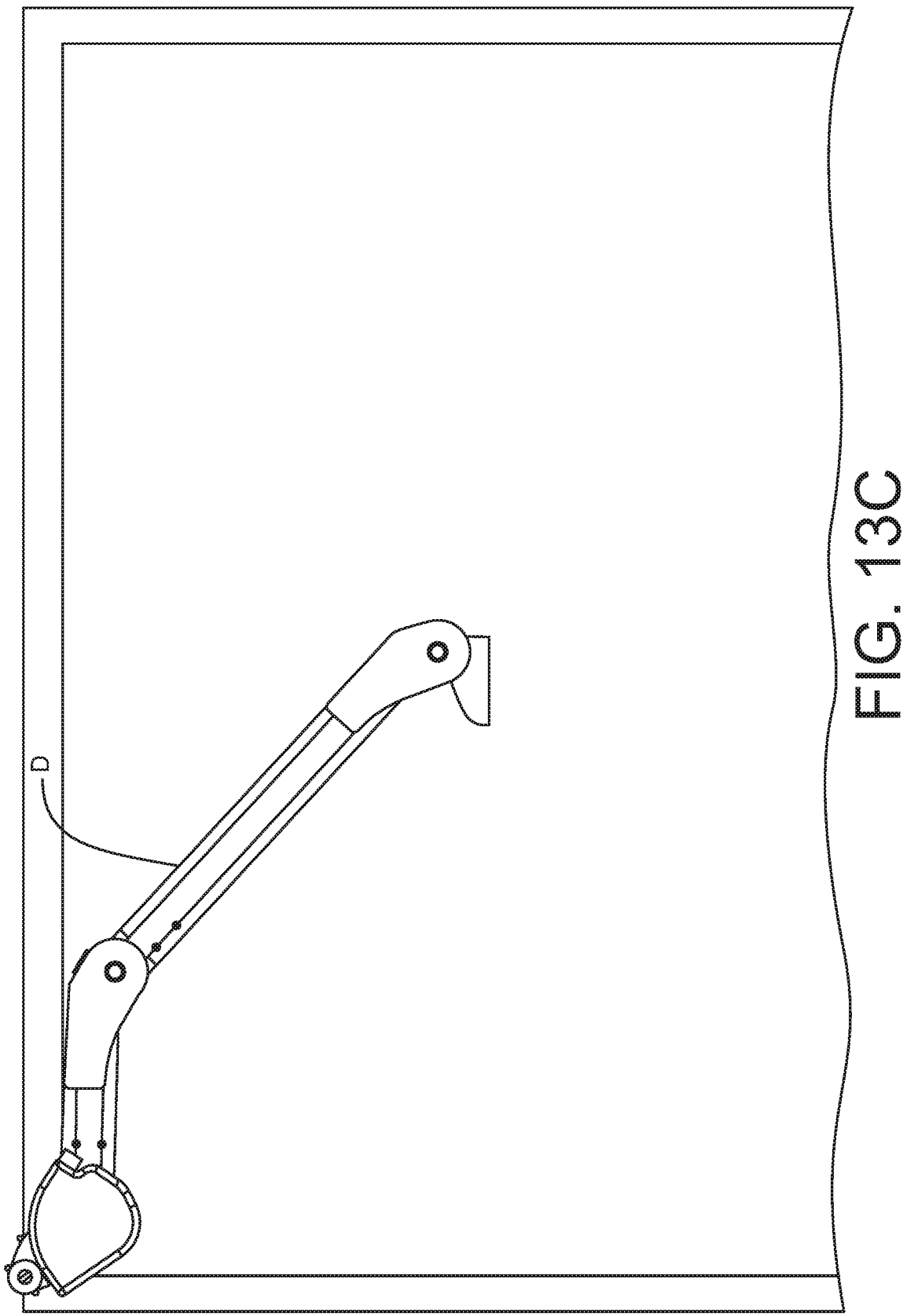

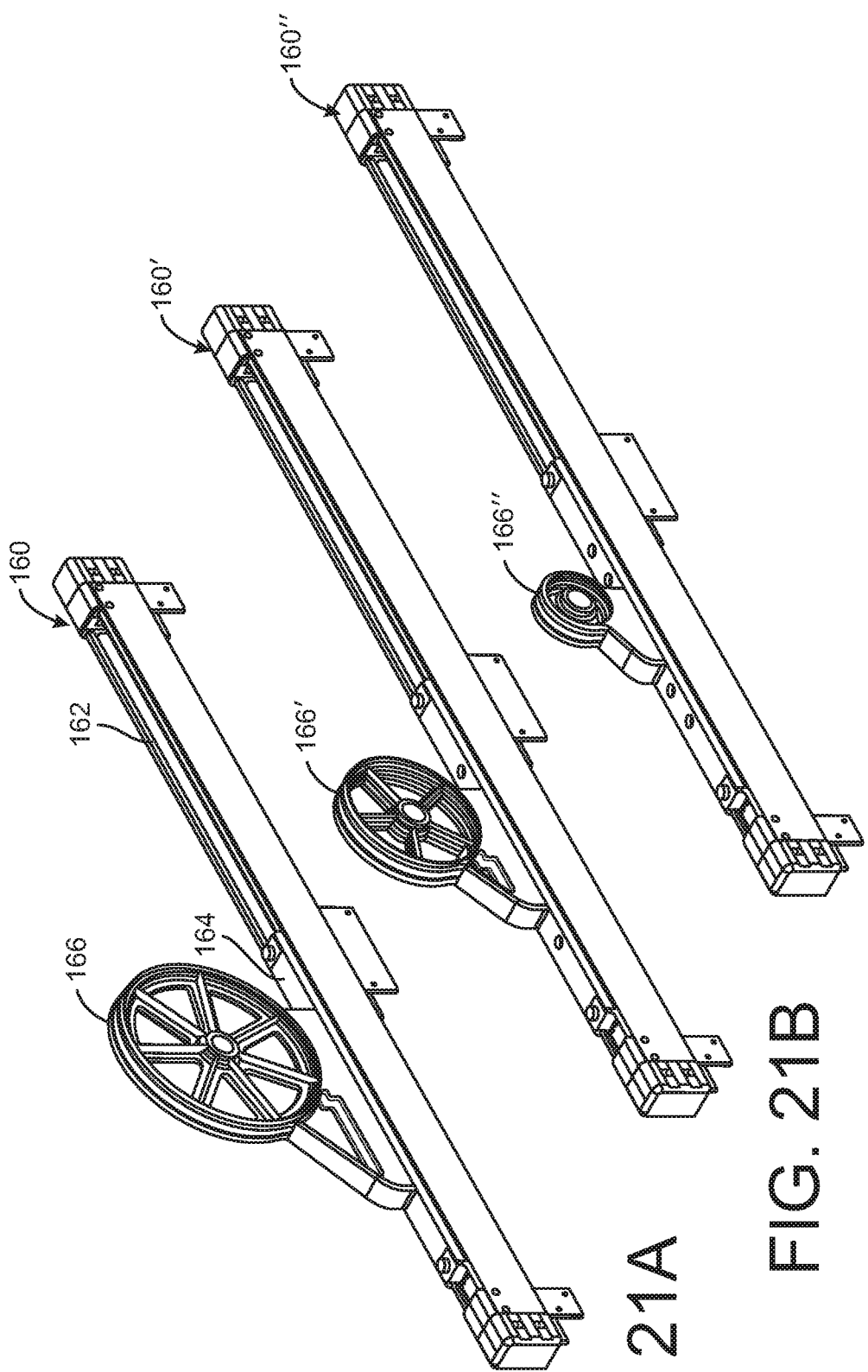

COVER SYSTEM FOR OPEN-TOPPED CONTAINERS

REFERENCE TO RELATED APPLICATION

This application is a continuation of pending application Ser. No. 15/252,831, filed on Aug. 31, 2016, entitled "Cover System for Open-Topped Containers", which is a utility filing from and claims priority to pending U.S. Provisional Application No. 62/213,052, entitled "Cover System" and filed on Sep. 1, 2015, to pending U.S. Provisional Application No. 62/386,294, entitled "Cover System" and filed on Nov. 25, 2015, and to pending U.S. Provisional Application No. 62/387,563, entitled "Cover System" and filed on Dec. 24, 2015. The entire disclosure of each of these provisional applications is incorporated herein by reference.

BACKGROUND

The present disclosure relates to cover systems for open-topped containers, such as dump bodies, refuse haulers, grain trailers and the like. These cover systems utilize flexible covers, such as tarpaulins, that are pulled across the open top of the container body. The flexible cover is wound onto a roller as the cover is moved to its open or stowed position and unwound from the roller as the cover is moved to a closed position covering the container body. An arm assembly supports the opposite ends of the flexible to control the movement of the cover to and from its end positions.

The conventional cover systems utilize torsion springs to propel the arms in one direction or another, typically from the open position to the closed, covering position. A motor winds the cover on the roller against the force of the torsion spring to pre-load the spring. When it is desired to deploy the cover, the motor is reversed and the torsion spring unwinds to gradually pull the cover to the covering position.

Torsion springs for cover systems can be underbody springs that are exposed to the harsh environment underneath a moving vehicle. Flat or spiral torsion springs are also used in cover systems, with the benefit of being contained within a housing at the side of the container body. However, each individual spiral spring does not provide enough torque to consistently move a typical cover system. Thus, multiple spiral springs are provided in a typical system, which increases the width of the spring pack and thus the width of the cover system. Various governmental regulations limit the width of a vehicle and thus the width that a cover system may extend beyond the sides of the vehicle. These width regulations limit the number of spiral springs that can be incorporated into a spring pack, and thus inherently limit the torque characteristics of the arm assembly.

Consequently, there is a need for a cover system that is capable of generating the torque profile needed to move a container cover system, while still maintaining a package dimension that meets all government width regulations.

SUMMARY

A cover system includes an arm assembly mounted between a container body and a flexible cover wound onto a roller. The arm assembly includes a force mechanism contained within a hollow arm of the assembly. The force mechanism includes a resiliently compressible element, such as a compression spring, with a cable or wire extending through the element. The cable is fastened at one end to an end cap that bears against one end of the compression spring. The opposite end of the cable is fastened to a base mounted to the container body. The base includes a pulley about which the cable is wound as the arm pivots relative to the base. As the arm pivots and the cable winds about the pulley, the end cap bears against the spring to compress the spring.

The cover system can include a motor mounted to the free end of the arm assembly and engaged to the roller carrying the flexible cover. The motor is operable to wind the cover around the roller to move the cover to its open position uncovering the open top of the container. The force mechanism is configured to unwind the cover form the roller to move the cover from its open position to its closed position covering the open top of the container.

DESCRIPTION OF THE FIGURES

FIG. 11 is an end view of the lower arm housing for the lower arm shown in FIG. 5.

FIGS. 13A, 13B and 13C are end views of the container shown in FIG. 1 with the arm assembly of the present disclosure in its closed, intermediate and open positions.

FIGS. 21A, 21b and 21c are perspective views of a sliding track incorporating a pulley according to the present disclosure for use with the arm assembly shown in FIG. 20.

DETAILED DESCRIPTION

Figure 1:
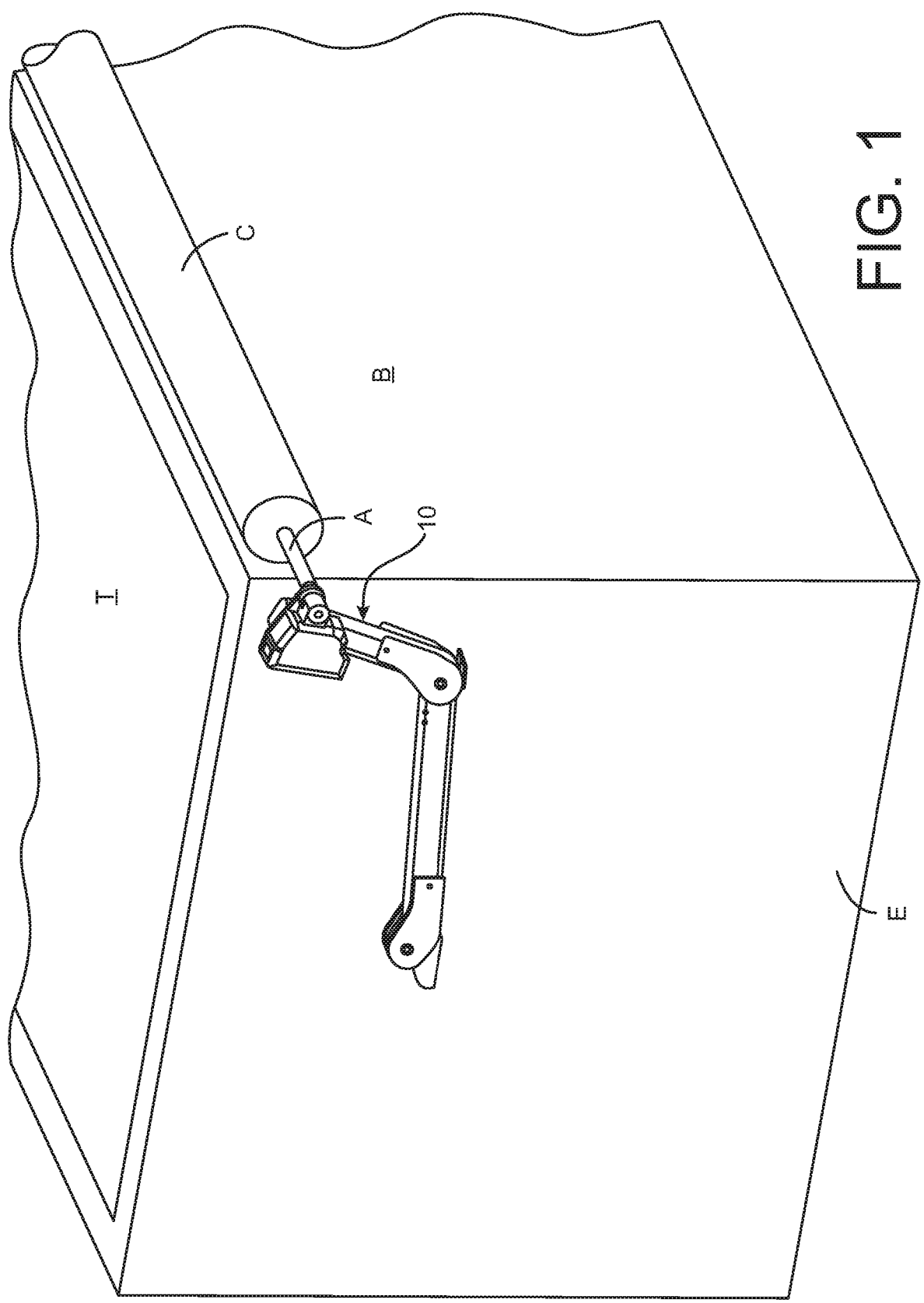
FIG. 1 is a perspective view of a container with an arm assembly for a side-to-sided cover system according to one aspect of the present disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

FIG. 1 shows container body B having an open top T and an end wall E. A cover system includes a flexible cover C, such as a tarpaulin, for covering the open top T. In the illustrated embodiment, the cover C is part of a side-to-side cover system in which the cover is moved from its open position shown in FIG. 1, to a closed position extending across the top T of the container. The cover C is mounted on a roller that is rotated about an axle A. An arm assembly 10 is provided that is configured to control the movement of the cover C between the open and closed positions. In some systems, the axle A is manually rotated, with the movement of the cover being guided by arm assemblies 10 on the front and rear end walls of the container. However, for the purposes of the present disclosure, the axle A is motor driven, as described in more detail herein.

Figure 2:
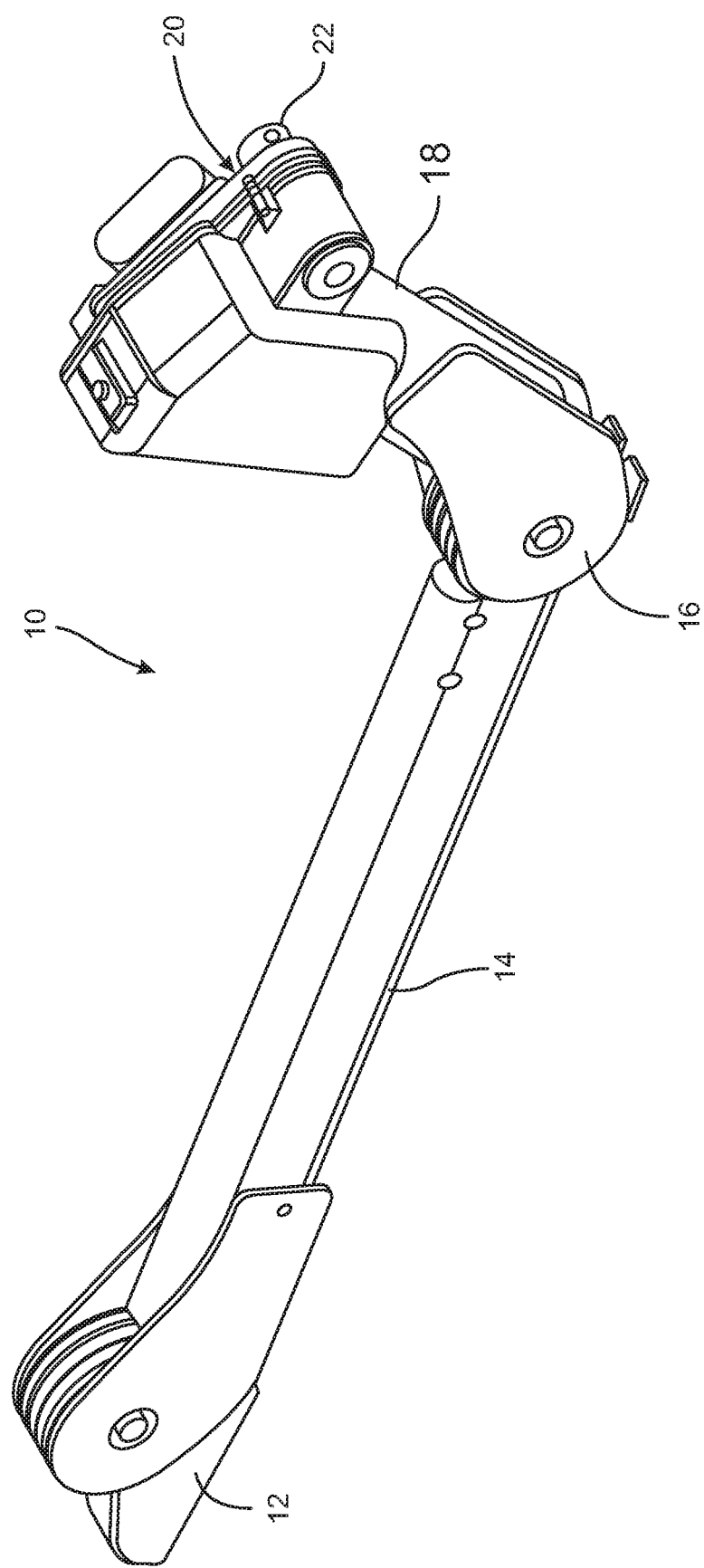
FIG. 2 is a perspective view of the arm assembly shown in FIG. 1, with the arm assembly in its closed position.
Figure 3:
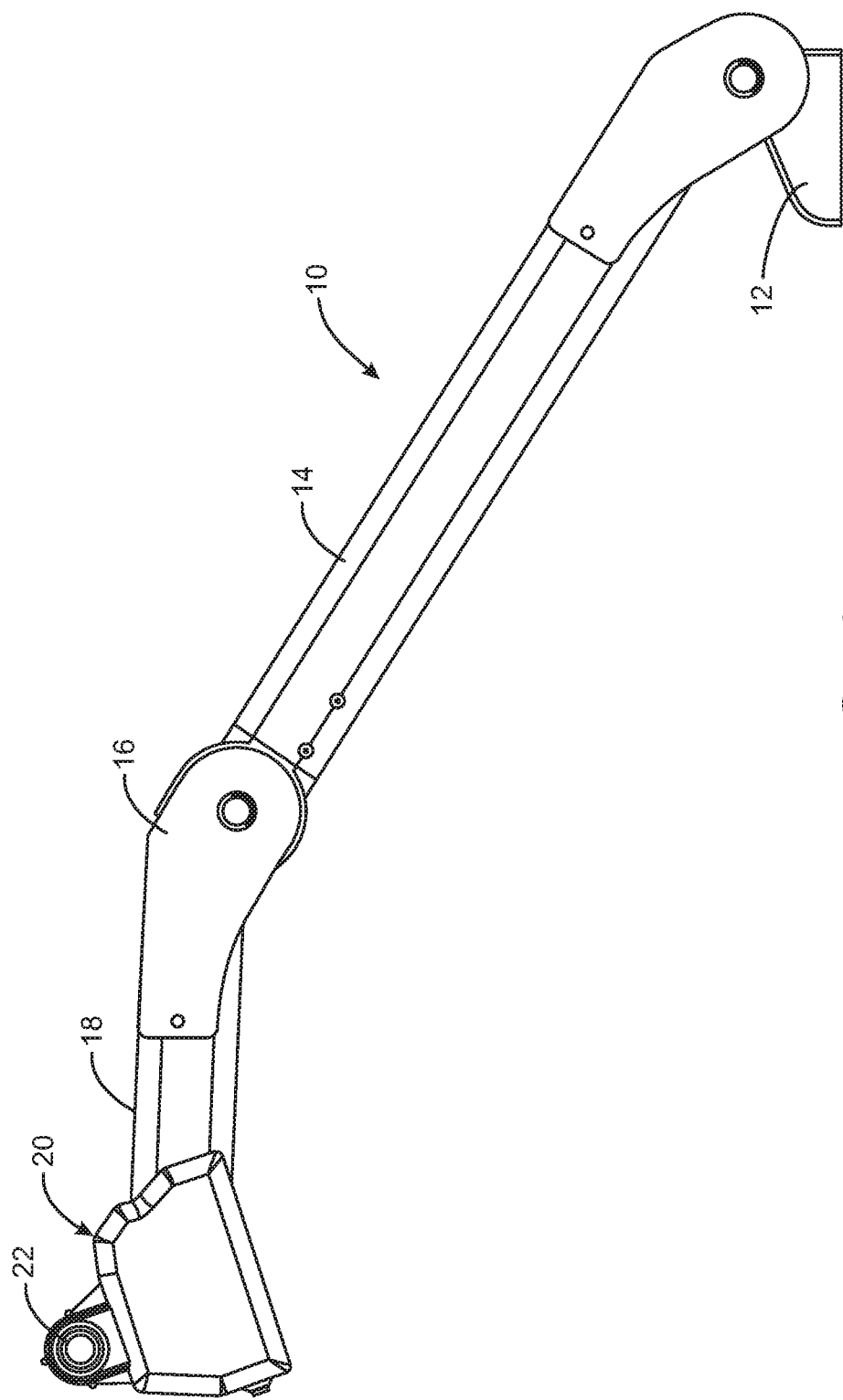
FIG. 3 is a side view of the arm assembly shown in FIG. 2 with the arm assembly in its open position.

As shown in FIGS. 2-3, the arm assembly 10 includes a base 12 adapted to be mounted to the container body, a lower arm 14 pivotably mounted to the base, a pivot joint 16, an upper arm 18 pivotably mounted to the pivot joint, and a motor assembly 20 with an axle collar 22 for engaging the axle A of the cover roller. The arm assembly 10 is thus configured to operate in a known manner as the arm pivots from the closed position shown in FIG. 2 to its open position shown in FIG. 3. The lower arm 14 thus pivots about the base 12 to sweep the arm assembly across the end wall E of the container, and the upper arm 18 pivots about pivot joint 16 to maintain the axle A in close proximity to the top of the container body B.

Figure 5:
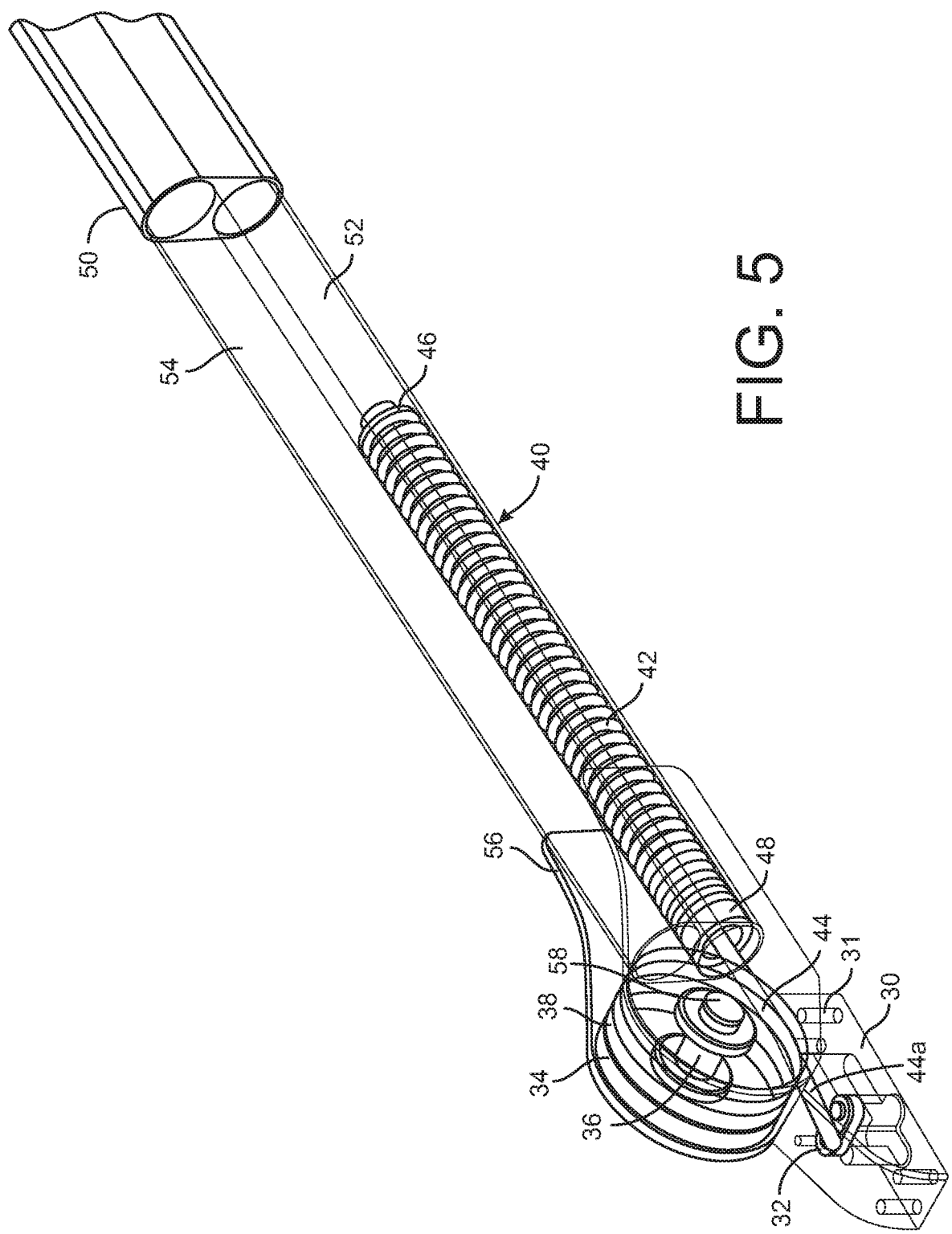
FIG. 5 is an enlarged cut-away view of the lower arm of the arm assembly shown in FIG. 4.
Figure 6:
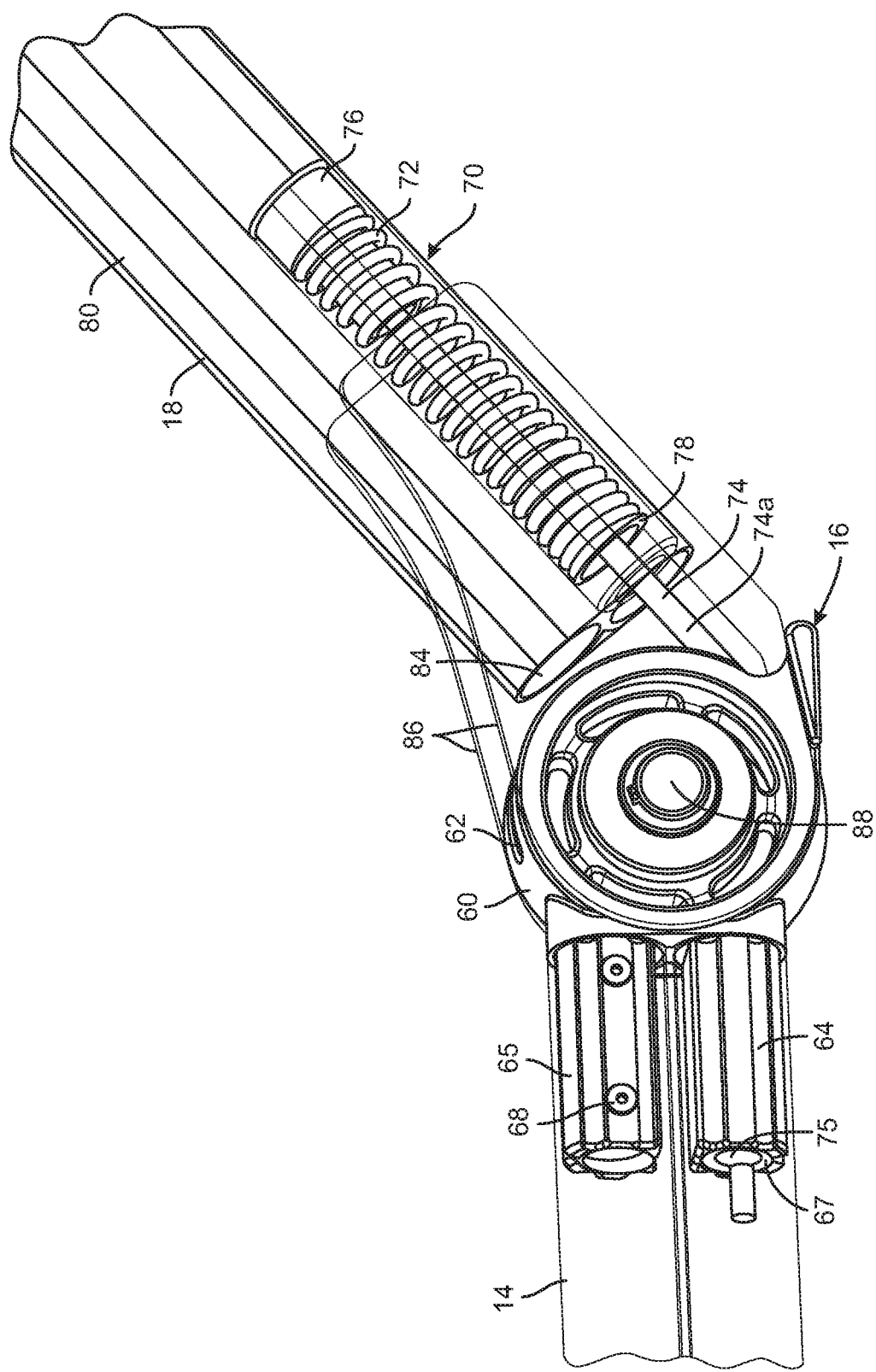
FIG. 6 is an enlarged cut-away view of the pivot joint of the arm assembly shown in FIG. 4.
Figure 7:
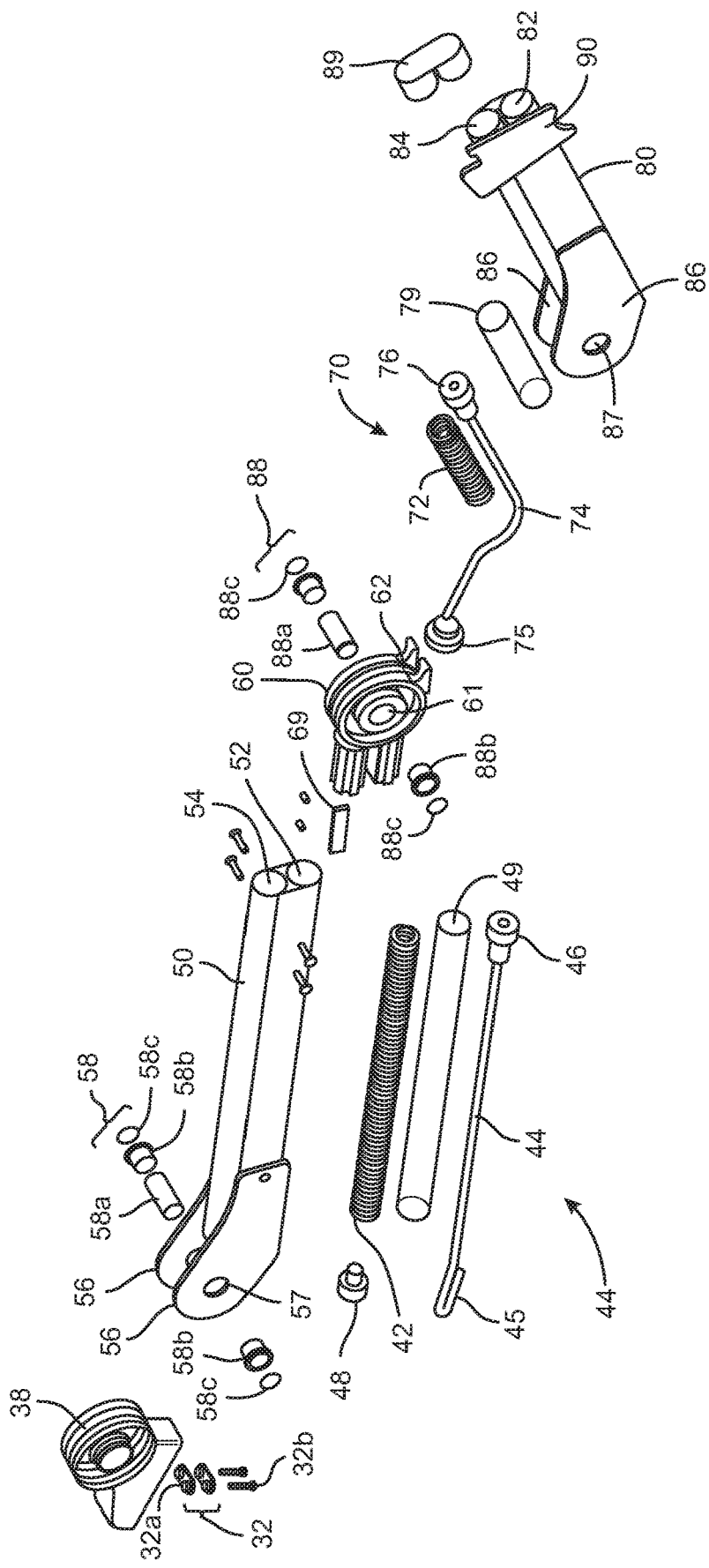
FIG. 7 is an exploded view of the arm assembly shown in FIG. 4.

The arm assembly 10 of the present disclosure thus operates in a known manner to move the cover C side-to-side across the open top T of the container body B. The conventional arm assembly for a flexible cover system relies on torsion springs coupled between the base and the lower arm to provide a return force to return the cover system to its closed position. The arm assembly 10 of the present disclosure relies on compression springs to generate the torque profile for the cover system. As shown in FIGS. 4-7, the arm assembly 10 includes a base body 30 that is adapted to be mounted to the container body B via mounting holes 31 in a known manner, depending upon the nature of the cover system—i.e., side-to-side, end-to-end, sliding mount, etc. The base body 30 includes a cable mount 32 for engaging the end 45 of a cable 44. In one embodiment, the cable mount includes opposing clamping plates 32a (FIG. 7) clamped together about the cable by screws 32b. The end 45 of the cable 44 may be bent, as shown in FIG. 7 to enhance the engagement with the cable mount 32. Other forms of cable mount 32 are contemplated that are capable of clamping and retaining the end of the cable 44 during the loading and unloading of the arm assembly 10. For instance, a ball or similar body may be crimped or welded onto the end of the cable with the ball sized to prevent its removal from the base body. The cable mount may be configured to permit adjustment of the cable within the base body 30 or may be configured to provide a fixed, non-adjustable cable length.

The base body 30 further includes a pulley 34 fixed to the base body. The pulley 34 defines a pivot bore 36 therethrough by which the lower arm 14 of the arm assembly is pivotably mounted, as described in more detail herein. The pulley 34 further defines a groove 38 in the outer surface or perimeter of the pulley that is sized to receive the cable 44, and particularly a wrap length 44a of the cable as the cable wraps partially around the stationary pulley 34, again as described in more detail herein.

The arm assembly 10 includes a lower torque mechanism 40 that is adapted to apply force to provide rotational movement to the lower arm 14. In accordance with one feature of the present disclosure, the force mechanism includes a compression spring 42 that is contained within a lower arm housing 50. The cable 44 extends through the center of the compression spring 42 and is constrained against the outboard end of the spring by an end cap 46. The opposite inboard end of the spring 42 is fixed to the housing 50 by a spring base 48. A sheath 49 surrounds the spring to reduce the friction between the spring and the inner wall of the housing 50.

Figure 8:
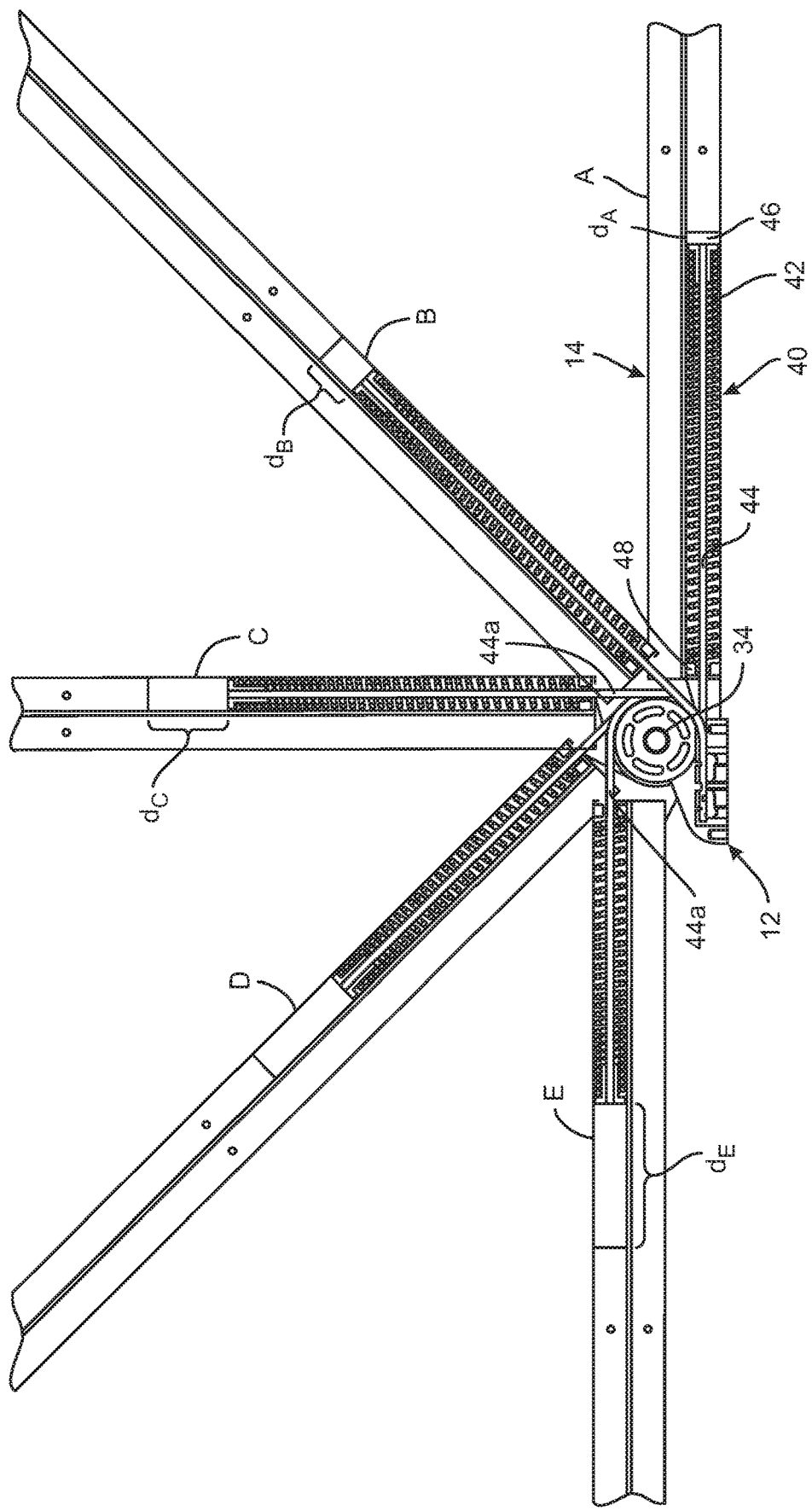
FIG. 8 is a side view showing the lower arm of the arm assembly shown in FIG. 4, depicting the arm in different positions between its closed position and its open position.

The operation of the lower force mechanism 40 is illustrated in FIG. 8. The lower arm 14 is shown in five positions, from position A in which the cover is deployed over the top of the container, to the position E in which the lower arm 14 has been pulled to the retracted, or open, position. As can be seen in FIG. 8, as the lower arm 14 pivots relative to the pulley 34, the wrap length 44a of the cable 44 wraps around successively more of the circumference of the pulley 34. At the same time, the distance d of the end cap 46 from its initial position $d_A$ increases at each stage B-E. As can be appreciated, as the distance d increases the spring 42 is increasingly compressed between the moving end cap 46 and the fixed spring base 48. As the spring is compressed, the potential energy stored in the spring increases to its maximum value at the distance $d_E$. In one embodiment, the maximum travel can be about eight inches. In certain embodiments, each compression spring 42 can provide 2000 pounds of force at this maximum compression travel distance.

When the cover C is to be deployed, the lower arm 14 is permitted to pivot relative to the base 12 under operation of the spring 42 as it releases the stored energy. This energy release manifests itself as a force as the cable 44 unwinds about the circumference of the pulley 34 (or more correctly the circumference of the cable groove 38) to pivot the lower arm 14.

Figure 4:
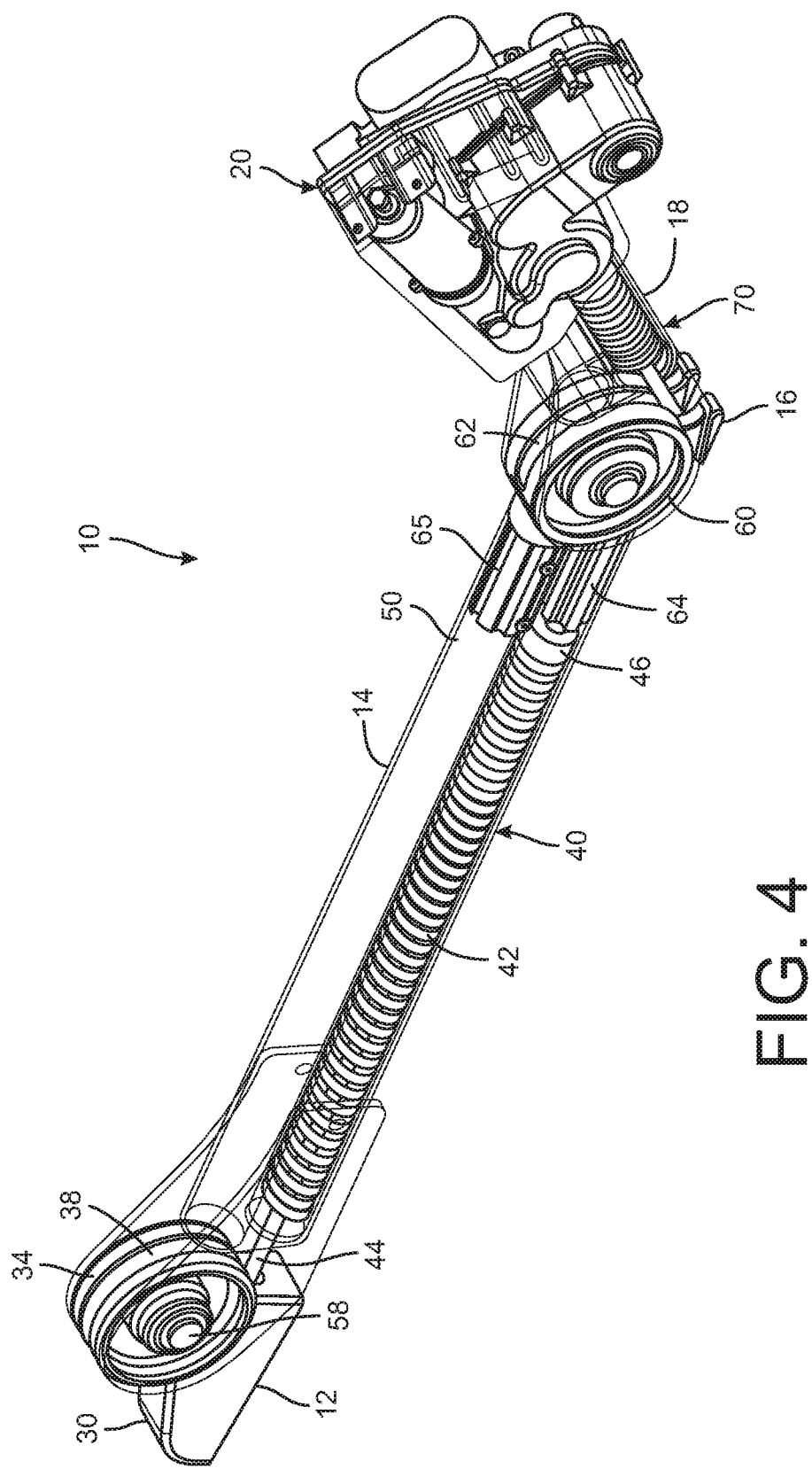
FIG. 4 is a perspective cut-away view of the arm assembly shown in FIG. 2.

It can be appreciated that the force mechanism 40 of the present disclosure can be readily modified to generate a wide range of force profiles. For instance, while a single spring 42 is shown in FIGS. 4-5, multiple compression springs can be stacked within the housing 50, with the springs have the same or different spring constants. The cable 44 would be appropriately sized to extend through the stacked springs. In the illustrated embodiments, the force mechanism 40 (as well as the upper mechanism 70) incorporates a compression coil spring. The spring 42 can be pre-loaded within the housing 50 as desired to achieve particular forces or rotational angles of the lower arm 14. The pre-loading can be accomplished by an adjustable spring base 48 or my adjusting the engagement between the cable 44 and the cable mount 32.

Figure 9C:
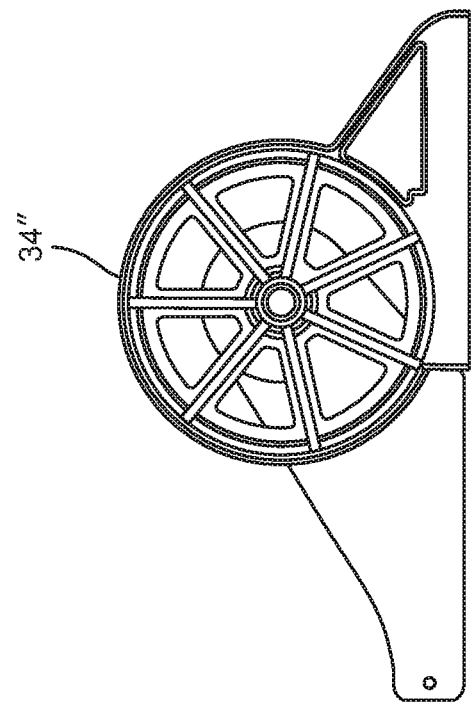
FIGS. 9A, 9B and 9C are side views of different pulleys for use with the arm assembly shown in FIG. 4.
Figure 9B:
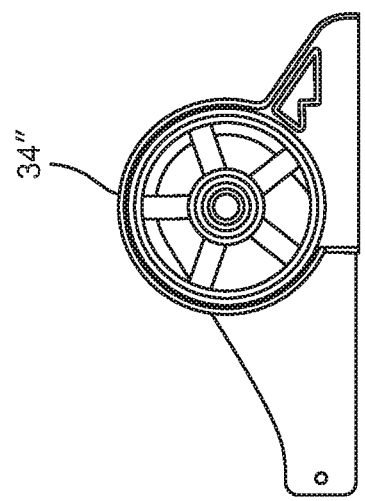
Figure 9A:
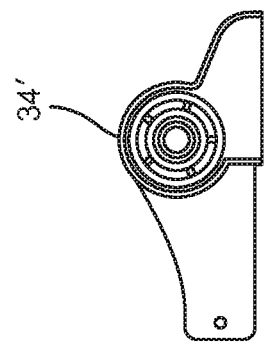

As shown in FIGS. 9A-9C, three different pulleys 34', 34", 34'" have increasingly larger outer diameters and thus increasingly larger circumferences for the cable 44 to wrap around as the lower arm is pivoted. Obviously, a cable wrapped around the smaller pulley 34' compresses the spring 42 less than a cable wrapped around the larger pulley 34'''. Pulley sizes can be based on available spring compression. For instance, in one embodiment, each additional spring can provide an additional eight inches of compression. The additional pulley size and spring or springs also dictates different offsets of the force mechanism. Spring force multiplied by offset provides the required force to move the pivot arms. Longer arms require more force. Since the amount of compression and offset determines the amount of stored energy in the spring, the force generation capability of the mechanism 40 can be adjusted by selecting the appropriate pulley diameter and spring count.

In the illustrated embodiments, the force mechanism utilizes compression coil springs. Other elastic or resiliently compressible elements are contemplated that are capable of storing and releasing elastic energy by compression. For instance, compressible elastic bushings may be implemented in the force mechanism.

Figure 10C:
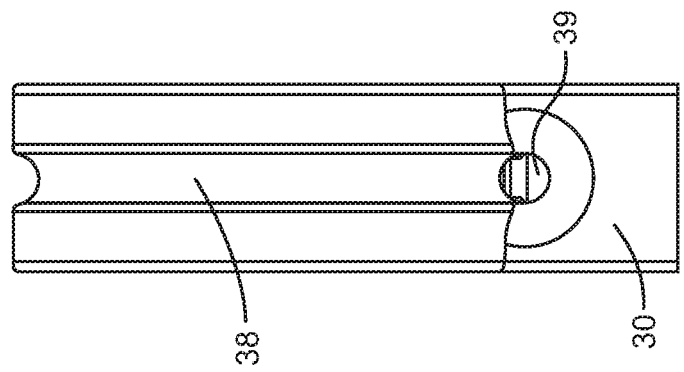
FIGS. 10A, 10B and 10C are side, top and end views of a pulley used in the arm assembly shown in FIG. 4.
Figure 10A:
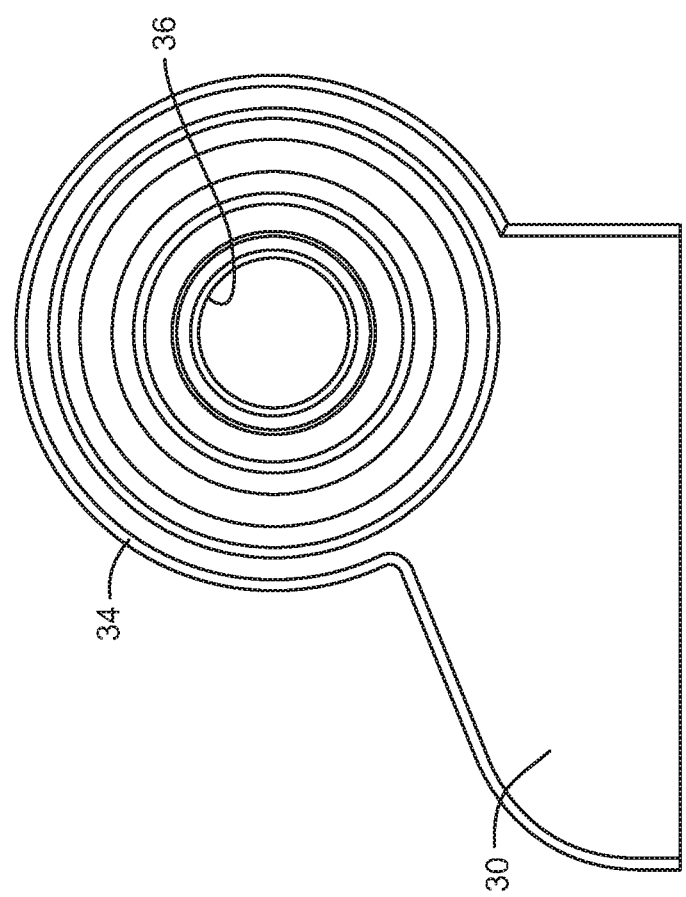
Figure 10B:
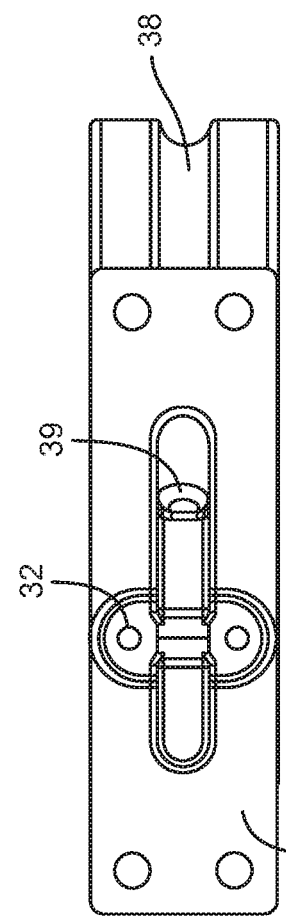
Figure 12C:
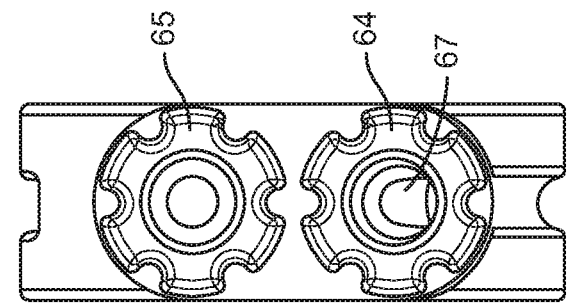
FIGS. 12A, 12B and 12C are side, top and end views of the pivot pulley for the pivot joint shown in FIG. 6.
Figure 12A:
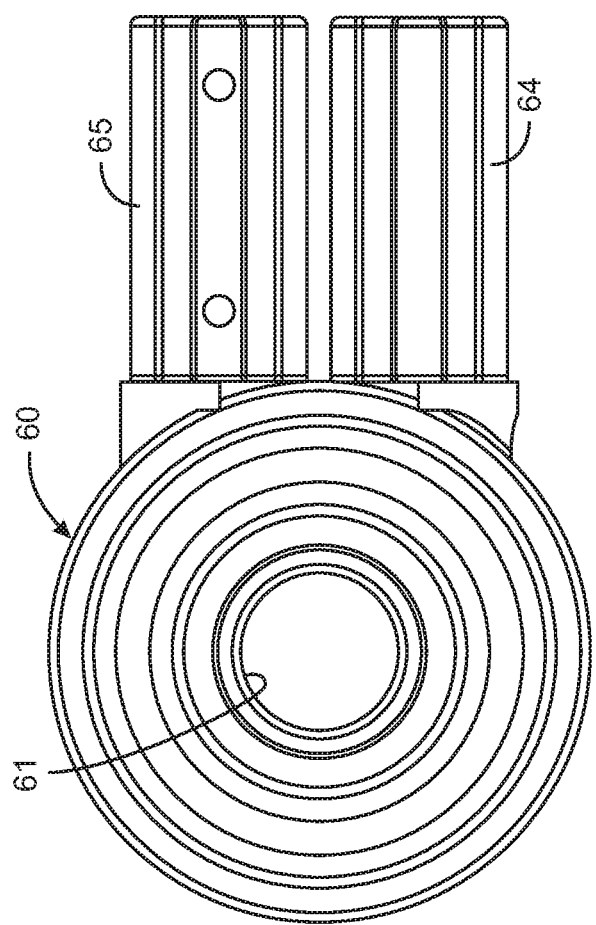
Figure 12B:
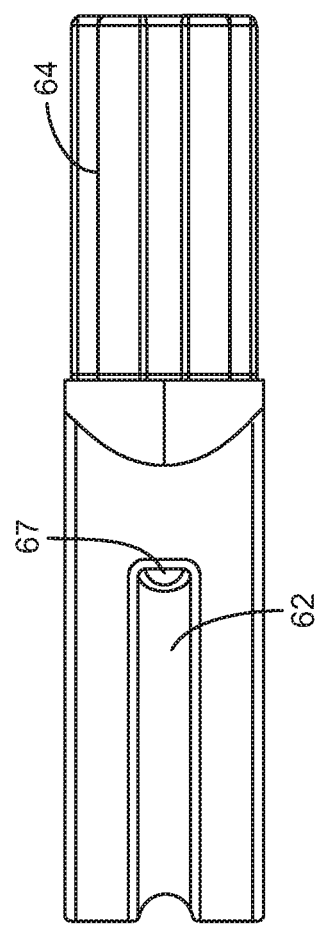

The pulleys 34 shown in FIGS. 9A-9C can be formed as an integral body with the base body 30, as shown in FIGS. 10A-10C. The cable groove 38 is formed in the outer circumference of the cylindrical body of the pulley 34. A cable opening 39 is aligned with the cable groove to provide access to the cable mount 32 within the base body 30. The pulleys in the illustrated embodiments define a circular outer perimeter so that the cable groove 38 is at a defined radius or diameter. However, the outer perimeter, and particularly the groove, can be non-circular, such as slightly elliptical, in order to generate a modified force and rotation profile for movement of the arm assembly.

The lower arm housing 50 can be formed as an extrusion, as illustrated in FIGS. 5 and 11. The housing includes a spring bore 52 within which the spring 42 and spring sheath 49 are positioned. The spring base 48 at the inboard end of the compression spring 42 can be fastened to the walls of the spring bore 52 in a conventional fashion, such as by welding. The housing further includes a secondary bore 54 that is used for engagement to the pivot joint 16, as described herein. The housing 50 can be affixed to the base 12 by a pivot mount 58 extending through openings 57 in a pair of mounting plates 56, as shown in FIG. 7. The pivot mount 58 can include a pin 58a, end bushings 58b and retaining rings 58c configured to allow the mounting plates 56, and thus the lower arm 14, to freely pivot or rotate relative to the base 12. The bushings 58b may incorporate or be replaced with a ball bearing assembly to reduce the pivot friction.

The pivot joint 16 incorporates a pivot pulley 60 that can be configured similar to the pulley 34. In particular, as illustrated in FIGS. 6-7 and 12A-12C, the pivot pulley 60 includes a pivot bore 61 and a cable groove 62 sized to receive a cable 74 that is integrated into the upper arm 18. However, unlike the pulley 34 that is integrated into a base body 30, the pivot pulley 60 is provided with structure to mate with the lower arm housing 50. In particular, the pivot pulley 60 includes a pair of mounting stems 64, 65 that are configured for a tight fit within a corresponding one of the bores 52, 54 in the lower arm housing 50. Mounting screws 58 are used to fasten only one stem 65 to the secondary bore 54 of the housing 50. A mounting plate 69 may extend through a central bore in the mounting stem 65 for engagement with the mounting screws 58. The other stem 64 is provided with a cable bore 67 for mounting an end of the cable 74.

The upper arm 18 includes its own upper force mechanism 70 that utilizes the cable 74 in the same manner as the cable 44 in the lower torque mechanism 40. The upper force mechanism 70 further includes a compression spring 72 that is disposed within an upper arm housing 80, as shown in FIG. 6. The cable 74 may be fastened to the mounting stem 64 by a clamping plate 69 and set screws 75. The clamping plate 69 may include a groove for receiving the cable and pressing the cable against the inner wall of the mounting stem 64. Other means for mounting the cable within the mounting stem 64 are contemplated that are capable of clamping and retaining the end of the cable 74 during the loading and unloading of the arm assembly 10. For instance, a ball or similar body may be crimped or welded onto the end of the cable with the ball sized to prevent its removal mounting stem 64. The cable mount may be configured to permit adjustment of the cable within mounting stem 64 or may be configured to provide a fixed, non-adjustable cable length.

A second end cap 76 is affixed to the opposite end of the cable for contacting the outboard end of the compression spring 72. The spring is contained between the end cap 76 and a spring base 78 that is affixed to the upper arm housing 80 in a manner similar to the spring base 48 of the lower force mechanism. A spring sheath 79 reduces friction between the spring and the inside wall of the upper housing as the spring compresses and expands.

The cable passes through a cable bore 67 in the pivot pulley 60 and through the mounting stem 74 for engagement with the end cap 75. The cable includes a wrap length 74a that is positioned to wrap around the circumference of the pivot pulley 60, or more particularly the cable groove 62. The upper force mechanism 70 thus operates in the same manner as the lower force mechanism 40, namely with the cable wrapping around the pulley as the upper arm 18 is pivoted or rotated relative to the pivot joint 16. Although the pivot joint 16 pivots with the lower arm 14, the pivot joint is fixed in relation to the upper arm 18. As the arm assembly 10 is retracted, the upper arm 18 will pivot to its limit along with the lower arm 14.

The upper arm housing 80 is similar in construction to the lower arm housing 50. Thus, the upper arm housing includes a spring bore 82 within which the force mechanism 70 resides, and a secondary bore 84. The open ends of the bores can be closed with a plug 89, or can be used for mounting other components, such as the motor assembly 20. A separate mounting plate 90 can also be provided for mounting other components thereto. The upper arm housing 80 includes a pair of mounting plates 86 defining pivot openings 87 for receiving the pivot pin 88. The pivot pin 88 extends through the mounting plates 86 and the pivot bore 61 in the pivot pulley 60, and may be configured like the pivot mount 58 of the lower arm. The upper arm 18 is thus free to pivot or rotate relative to the pivot pulley 60.

Figure 13A:
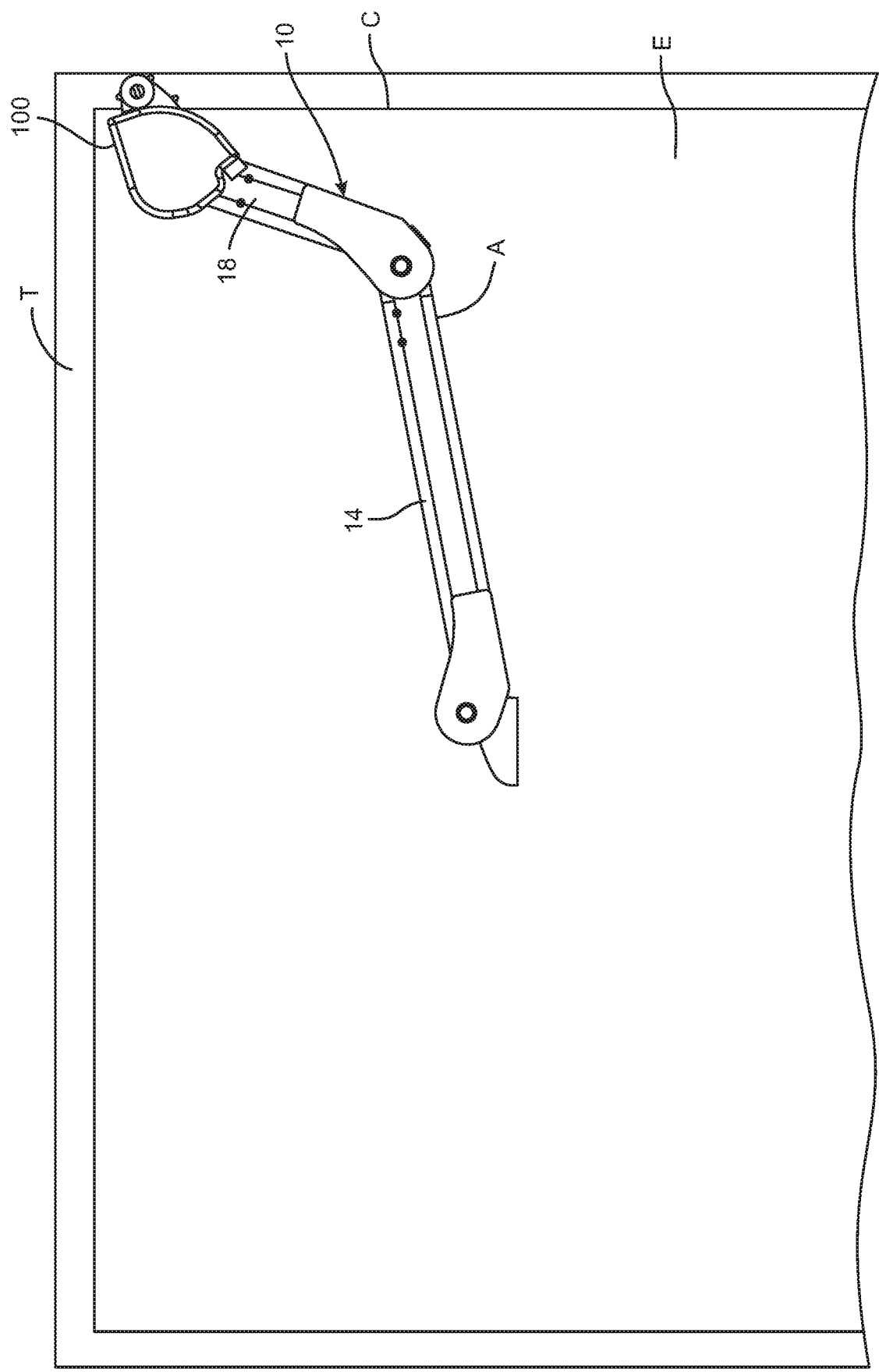

FIGS. 13A-13C show an arm assembly 10 with an alternative motor assembly 100 mounted to the end of the upper arm. The arm assembly is shown in three positions A, B and D depicted in FIG. 8 to illustrate the orientation of the arm assembly and motor assembly relative to the end wall E of the container C. It can be seen that the lower arm pivots through a much greater angle than the upper arm and that the lower arm tends to pivot after the lower arm has swept through a certain angle. It should be appreciated that the force mechanisms 40 and 70 can be tailored to achieve any desired force and rotation profile by selecting the number and stiffness of the compression springs as well as the diameters of the pulleys.

Figure 14:
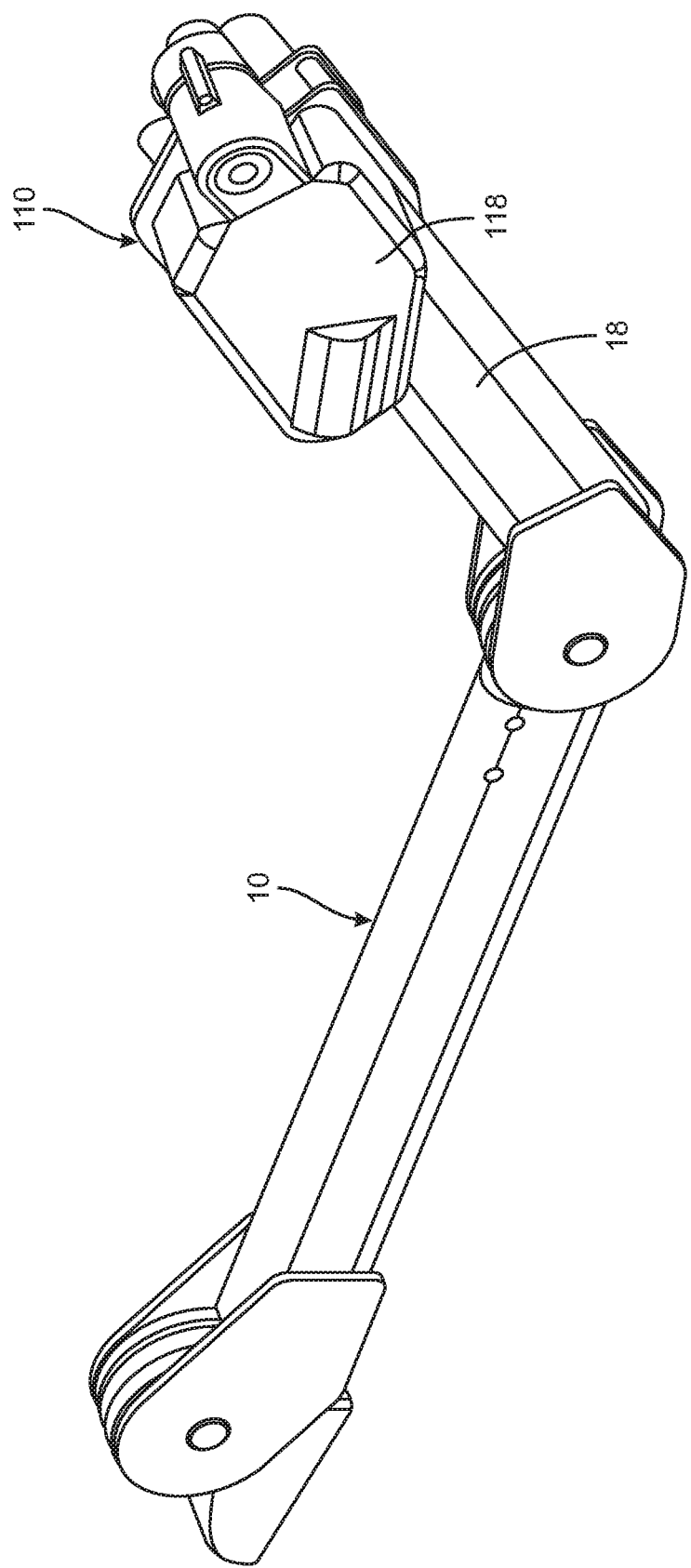
FIG. 14 is a perspective view of an arm assembly carrying an alternative motor assembly according to a further aspect of the present disclosure.
Figure 15:
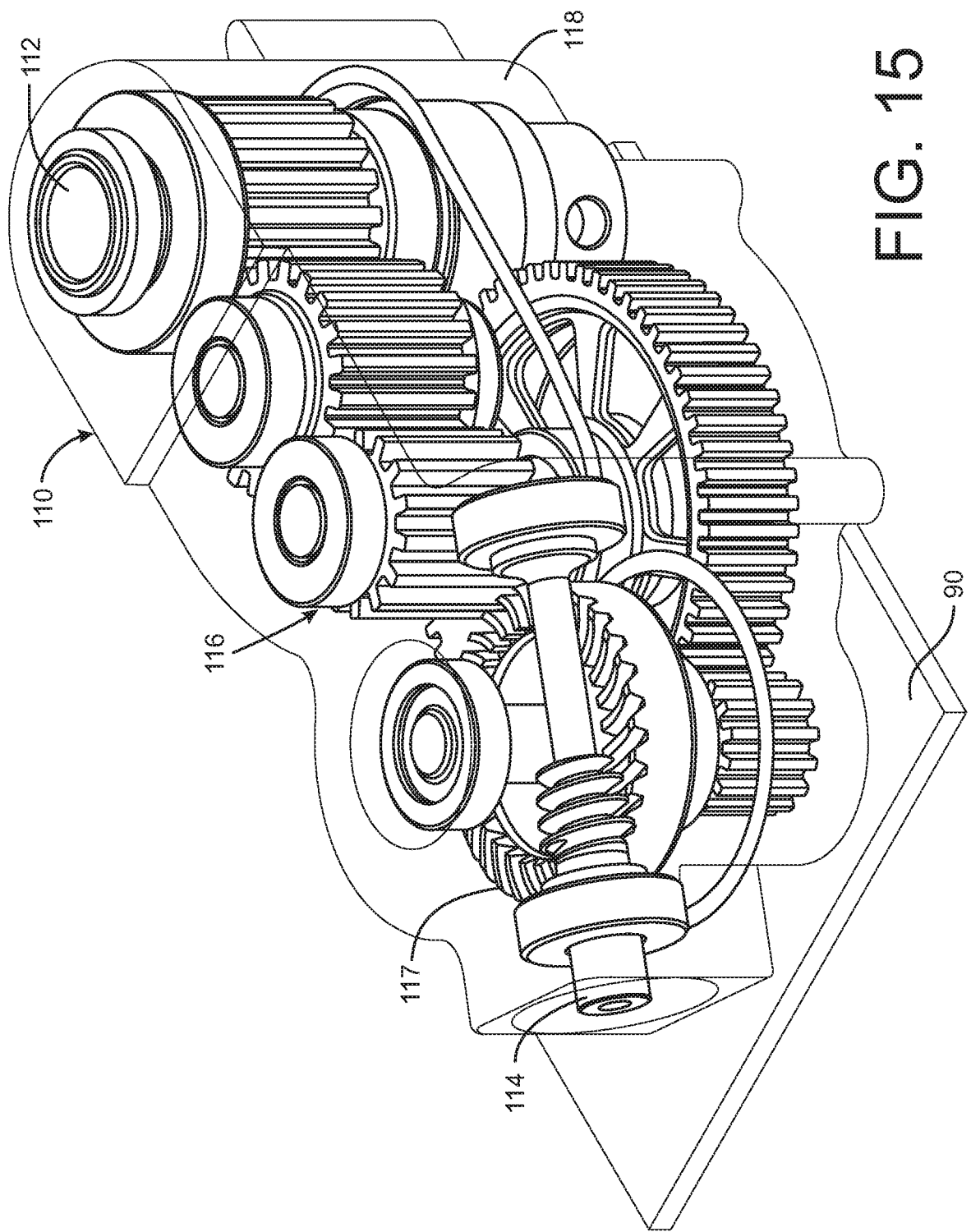
FIG. 15 is a top perspective cut-away view of a motor assembly to be carried by the arm assembly shown in FIG. 14.
Figure 16:
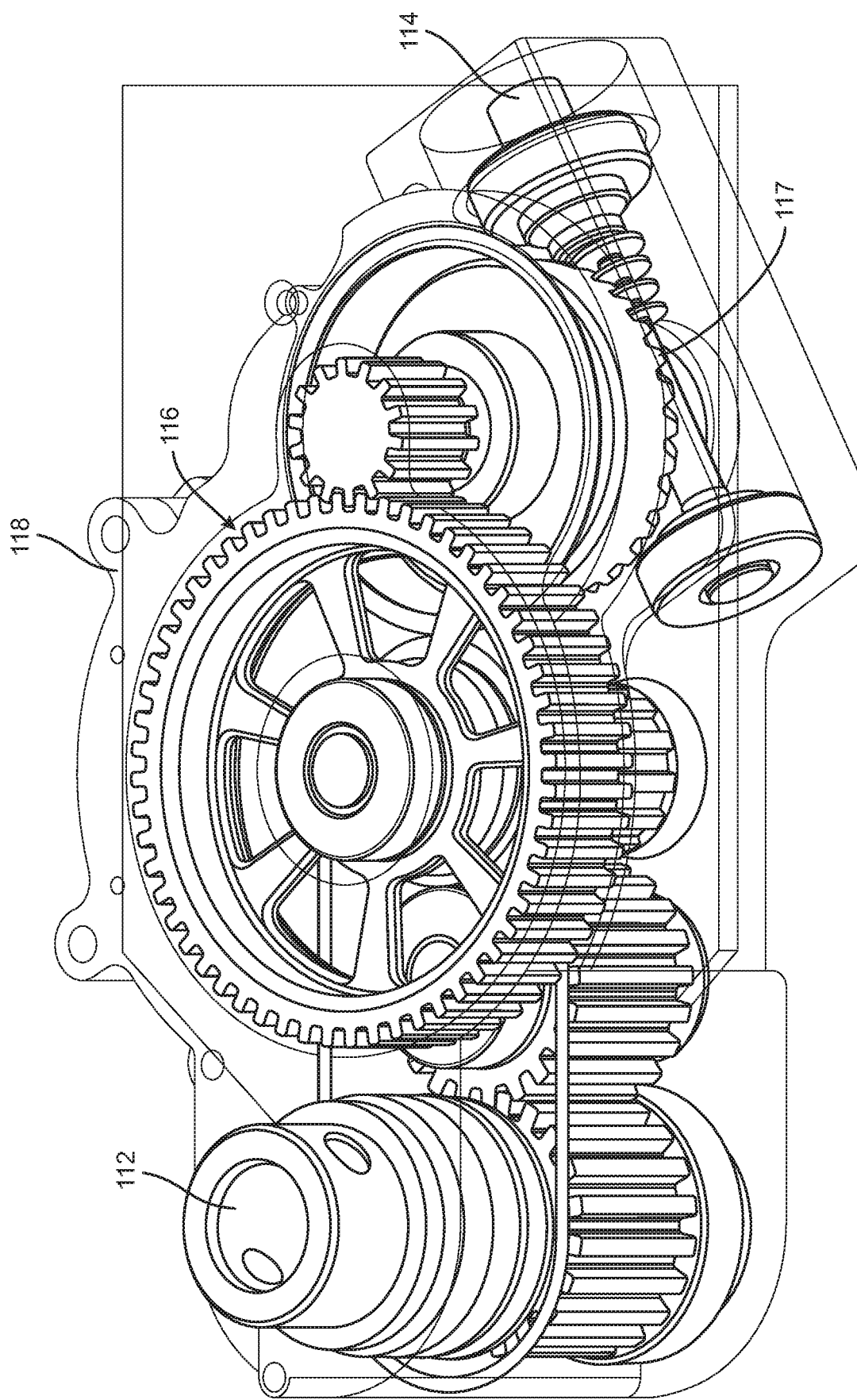
FIG. 16 is a bottom perspective cut-away view of a motor assembly shown in FIG. 15.
Figure 17:
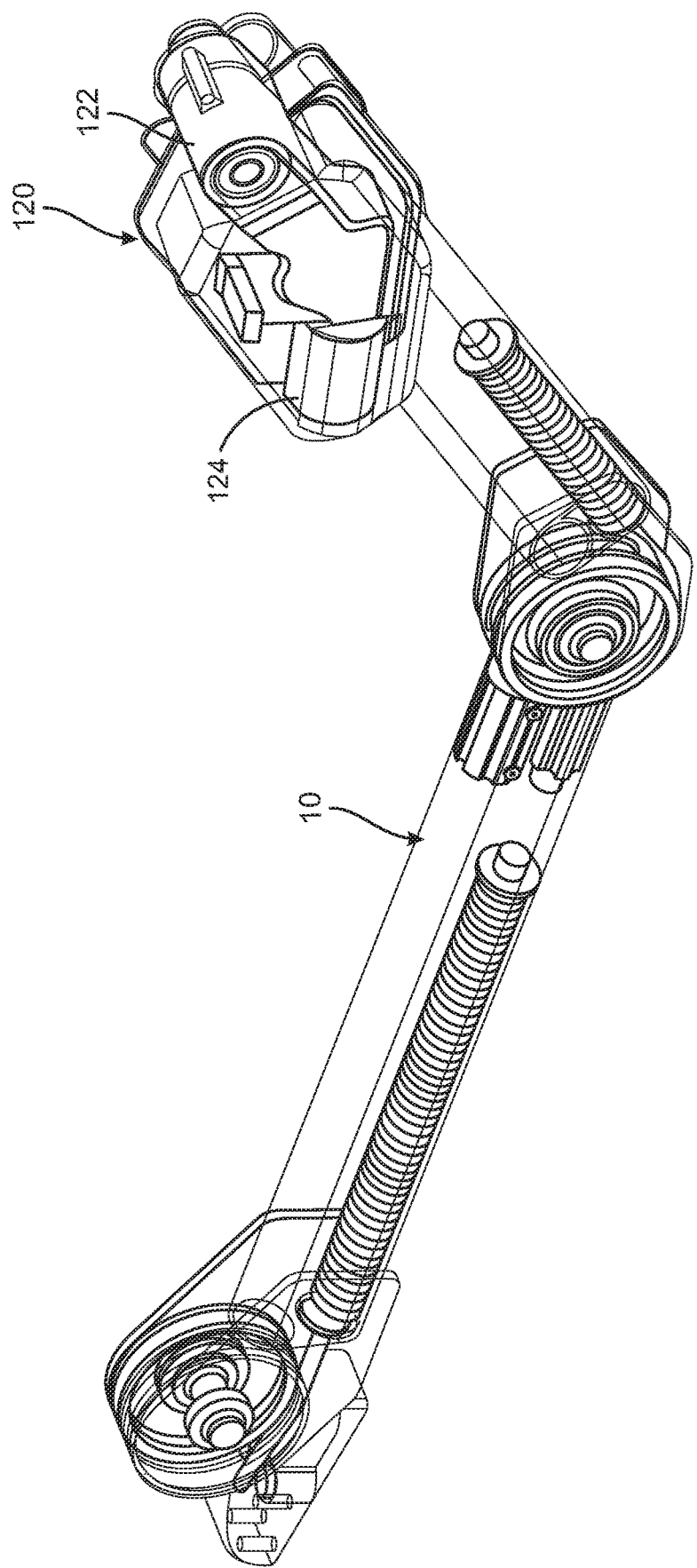
FIG. 17 is perspective cut-away view of an arm assembly carrying another motor assembly according to a further aspect of the present disclosure.

An arm assembly with another motor assembly 110 is shown in FIG. 14, with details of the motor assembly depicted in FIGS. 15-16. The motor assembly 110 includes a housing 114 that is mounted to the upper arm 18, such as by the mounting plate 90. The assembly includes an axle collar 112 that mates the axle A of the cover system C, as discussed above. An input shaft 114 is provided to mate with a motor, and a reduction gear train 116 transmits rotation and torque from the input shaft to the axle collar. The gear train may incorporate a hypoid gear interface 117 at the input shaft 118. FIG. 17 illustrates an arm assembly carrying a motor assembly 120 that includes the motor 124 within the housing 122.

Figure 18:
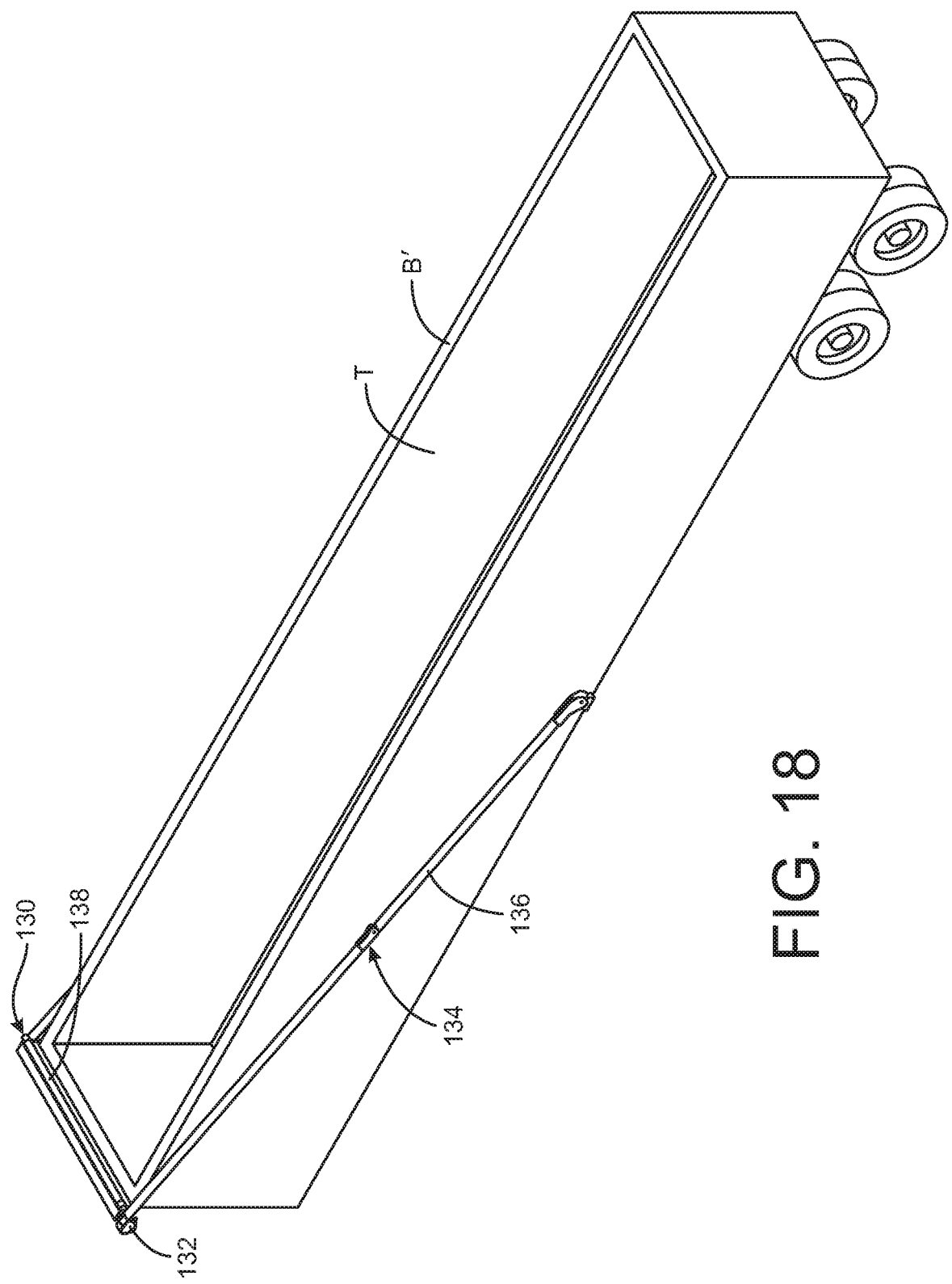
FIG. 18 is perspective view of an arm assembly for a cover system according to a further embodiment of the present disclosure.

The force mechanism 40 can be incorporated into an end-to-end cover assembly 130, such as shown in FIG. 18. The cover is retracted into a housing 132 at one end of the trailer body B'. A bail arm assembly 134 includes bail arms 136 on opposite sides of the body, with a cross bar 138 spanning the open top T and configured to engage one end of the flexible cover. As shown in more detail in FIG. 19, the bail arm 136 can incorporate a torque mechanism 140 that includes multiple compression springs 142 stacked along the length of the housing 137. A cable 144 extends along the length of the stacked springs and is fixed to the pulley 148 in the manner described above. A sheath 146 encases the stacked springs.

Figure 19:
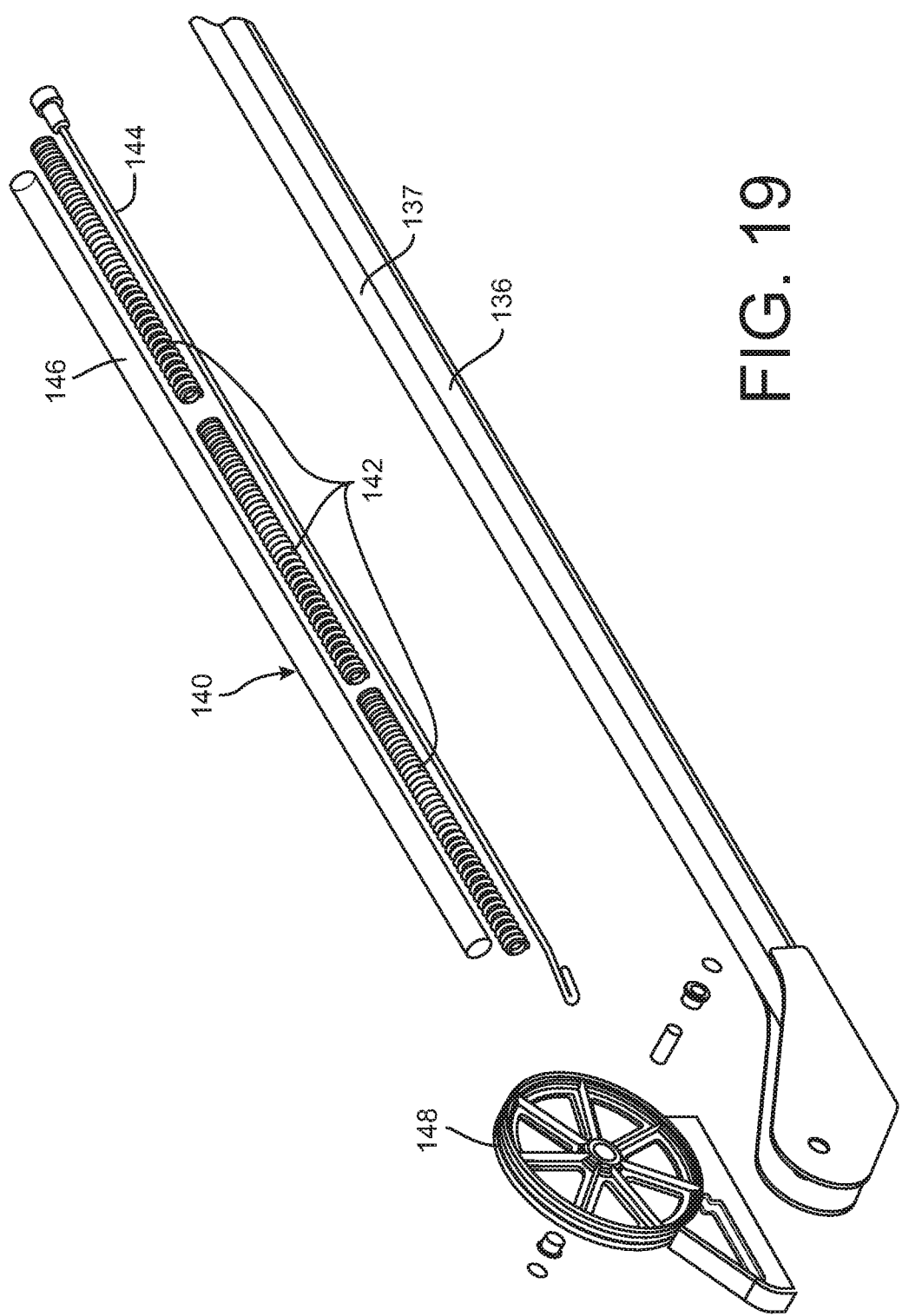
FIG. 19 is an exploded view of a bail arm of the arm assembly shown in FIG. 18.
Figure 20:
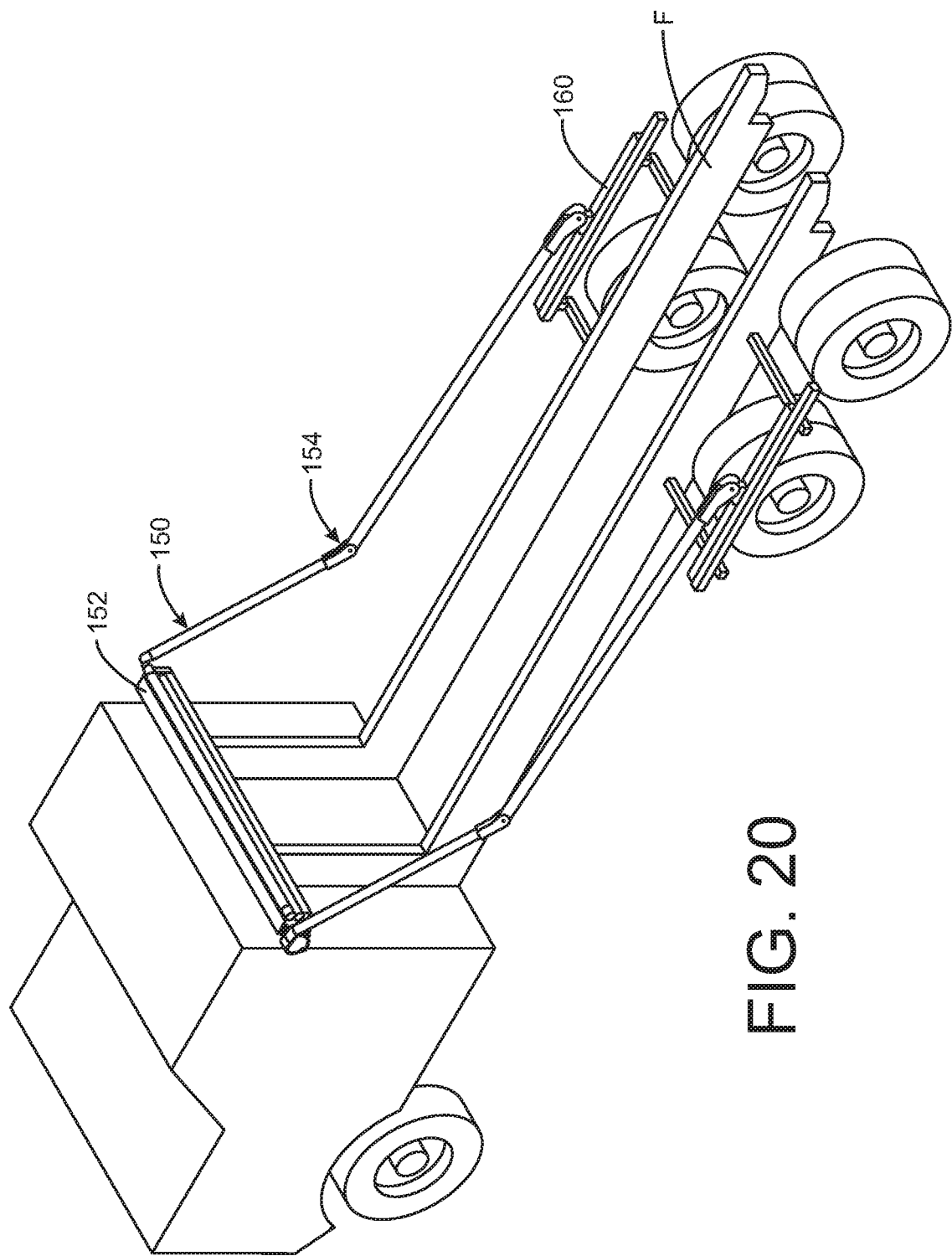
FIG. 20 is a perspective view of an arm assembly for a cover system according to yet another embodiment of the present disclosure.

The force mechanism can also be incorporated into the cover system 150 shown in FIG. 20, and in particular can be integrated into the bail arm assembly 154 in the same manner as shown in FIG. 19. However, in this embodiment the pulley 166 is mounted on a sliding mount 160 supported on the vehicle frame F, as shown in FIG. 21A. The pulley 166 is carried by a sliding base 164 slidable mounted within a track 162 so that the location of the pivot point for the bail arm assembly 154 can be adjusted, as is known in the art. As shown in FIGS. 21B-C, pulleys 166' and 166" of different diameters may be carried by the sliding mount 160.

The present disclosure should be considered as illustrative and not restrictive in character. It is understood that only certain embodiments have been presented and that all changes, modifications and further applications that come within the spirit of the disclosure are desired to be protected.

What is claimed is:

1. An arm assembly for a cover system to cover the open top of a container, comprising:
   a pulley including an outer curved surface;
   an elongated housing with one end pivotably mounted on said pulley, said housing defining an elongated bore extending from said one end at least part way through said housing;
   a resiliently compressible element disposed within the elongated bore, the compressible element having an inboard end positioned at one end of said bore adjacent said pulley, and an opposite outboard end;
   a spring base fixed to said elongated housing adjacent said one end to support said compressible element at said inboard end thereof;
   a base mountable on the container and supporting said pulley;
   a cable extending through said compressible element, one end of said cable engaged to said outboard end of said compressible element, said cable wrapped around at least a portion of said outer curved surface of said pulley and including an opposite end extending outward from said pulley; and
   a cable mount supported by said base separate from said pulley and configured to fix said opposite end of said cable to said base,
   whereby as said housing pivots relative to said pulley said cable wraps further around said outer curved surface of said pulley to thereby compress said compressible element between said one end of said cable and said spring base.

2. The arm assembly of claim 1, wherein said resiliently compressible element includes one or more compression springs.

3. The arm assembly of claim 2, wherein the resiliently compressible element includes two or more compression springs in stacked relation with said cable extending through each of said two or more springs.

4. The arm assembly of claim 1, wherein said pulley defines a groove at said outer curved surface, said groove sized to receive said cable therein.

5. The arm assembly of claim 1, wherein said pulley is integrally formed with said base.

6. The arm assembly of claim 1, wherein said base includes a cable mount aligned with said opening and configured to adjustably clamp said opposite end of said cable to said base.

7. The arm assembly of claim 1, wherein said cable includes an end cap affixed to said one end of said cable, said end cap configured to engage said outboard end of said compressible element.

8. The arm assembly of claim 1, wherein said resiliently compressible element is disposed within an elongated sheath, which sheath is disposed within said elongated bore.

9. An arm assembly kit for a cover system to cover the open top of a container, comprising:
   a pulley including an outer curved surface defined at a diameter, said pulley selected from a plurality of pulleys each having a successively larger diameter;
   an elongated housing with one end pivotably mounted on said pulley, said housing defining an elongated bore extending from said one end at least part way through said housing;
   a resiliently compressible element disposed within the elongated bore, the compressible element having an inboard end positioned at one end of said bore adjacent said pulley, and an opposite outboard end;
   a spring base fixed to said elongated housing adjacent said one end to support said compressible element at said inboard end thereof;
   a cable extending through said compressible element, one end of said cable engaged to said outboard end of said compressible element, said cable engaging at least a portion of said outer curved surface of said pulley and including an opposite end extending outward from said pulley; and
   a cable mount configured to fix said opposite end of said cable in relation to said pulley,
   whereby as said housing pivots relative to said pulley said cable wraps around said outer curved surface of said pulley to thereby compress said compressible element between said one end of said cable and said spring base; and
   whereby the successively larger diameters of said plurality of pulleys produces increasingly greater compression of said compressible element as said housing pivots, said pulley being selected from said plurality of pulleys based on a desired compression of said compressible element.

10. The arm assembly kit of claim 9, wherein said resiliently compressible element includes one or more compression springs.

11. The arm assembly kit of claim 10, wherein each of said one or more compression springs is sized to generate at least 2000 lbs. force at a maximum compression of eight inches.

12. The arm assembly kit of claim 10, wherein the resiliently compressible element includes two or more compression springs in stacked relation with said cable extending through each of said two or more springs.

13. The arm assembly kit of claim 12, wherein each of said two or more compression springs is sized to generate at least 2000 lbs. force at a maximum compression of eight inches.

14. The arm assembly kit of claim 12, wherein said two or more compression springs are selected from a first plurality of springs having a different predetermined maximum compression, and/or from a second plurality of springs having a different spring constant.

15. The arm assembly kit of claim 9, wherein said pulley defines a groove at said outer curved surface, said groove sized to receive said cable therein.

16. The arm assembly kit of claim 9, wherein said pulley is integrally formed with a base mountable on the container.

17. The arm assembly kit of claim 16, wherein said cable mount is configured to adjustably clamp said opposite end of said cable to said base.

18. The arm assembly kit of claim 9, wherein said cable includes an end cap affixed to said one end of said cable, said end cap configured to engage said outboard end of said compressible element.

19. The arm assembly kit of claim 9, wherein said resiliently compressible element is disposed within an elongated sheath, which sheath is disposed within said elongated bore.

* * * * *